United States Patent [19]

Rosaen

[11] 3,776,037

[45] Dec. 4, 1973

[54] FLOW INDICATOR DEVICE WITH SEALING MEANS

[76] Inventor: Nils O. Rosaen, 3774 Quarton Rd., Bloomfield Hills, Mich. 48013

[22] Filed: Oct. 30, 1972

[21] Appl. No.: 301,861

Related U.S. Application Data

[63] Continuation-in-part of Ser. No. 50,651, June 29, 1970, Pat. No. 3,724,269.

[52] U.S. Cl. ................................................ 73/228
[51] Int. Cl. .......................................... G01f 1/00
[58] Field of Search ................ 73/228; 277/84, 174, 277/175

[56] References Cited
UNITED STATES PATENTS

| | | | |
|---|---|---|---|
| 2,248,030 | 7/1941 | Zwack | 73/228 X |
| 3,282,102 | 11/1966 | Rosaen | 73/228 |
| 3,600,048 | 8/1971 | Makhobey | 277/84 |
| 3,685,354 | 8/1972 | Rosaen | 73/228 |

*Primary Examiner*—Richard C. Queisser
*Assistant Examiner*—John P. Beauchamp
*Attorney*—Robert C. Hauke et al.

[57] ABSTRACT

A flow indicator device having a housing with inlet and outlet ports respectively adapted to be connected with a source of fluid pressure and a fluid user. A semi-circular vane member mounted within the housing is movable in response to a change in the flow rate between the inlet and outlet ports to rotate a shaft to which the vane member is attached. The shaft, in turn, extends externally of the housing and is operatively coupled to an indicator for providing an external visual indication of the rate of flow through the device. A spring balanced seal is provided between the vane member and an internal wall of the housing separating the inlet and the outlet.

4 Claims, 5 Drawing Figures

PATENTED DEC 4 1973　　3,776,037
FIG.1
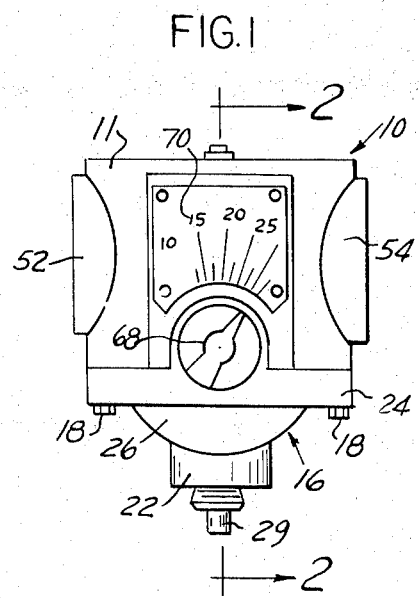
FIG.2
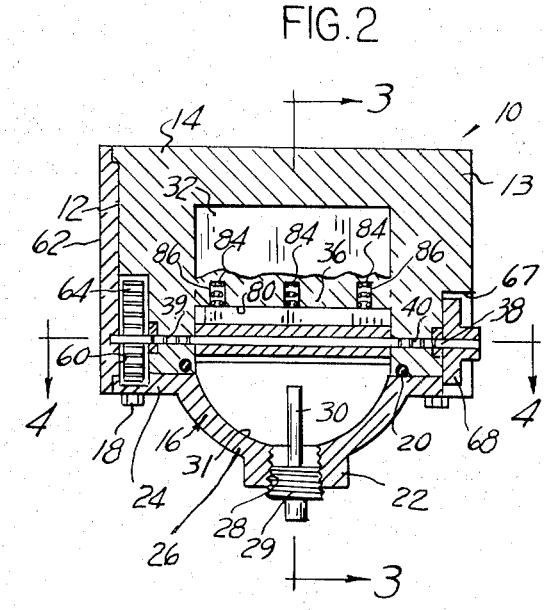
FIG.3
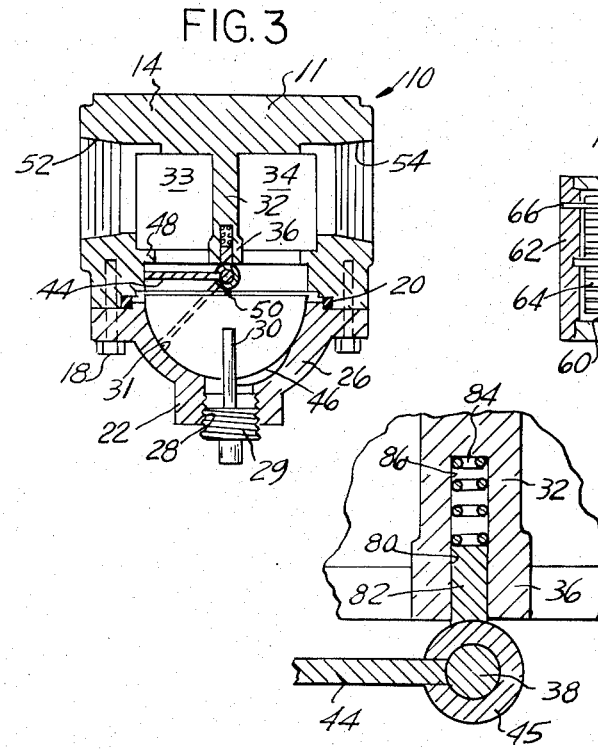
FIG.4
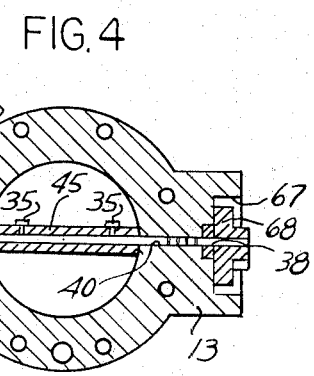
FIG.5

FLOW INDICATOR DEVICE WITH SEALING MEANS

CROSS-REFERENCE TO RELATED APPLICATIONS

The present application is a continuation-in-part of U.S. Pat. application Ser. No. 50,651, filed June 29, 1970, now U.S. Pat. No. 3,724,269 for "Fluid Device Having Flow Control and Indicating Means," and the present patent application is related in substance to U.S. Pat. No. 3,282,102, issued Nov. 1, 1966, for "Flow Indicators" and U.S. Pat. No. 3,685,354 issued Aug. 22, 1972, for "Flow Indicator Device Having Pressure Balanced Sealing Shaft."

BACKGROUND OF THE INVENTION

1. Field of the Invention

The present invention relates to fluid systems and, more particularly, to a fluid device for indicating the rate of fluid flow through such a system, and a new and improved means for providing a balanced seal between the vane member and the internal wall dividing the inlet and outlet for such devices.

2. Description of the Prior Art

A variety of measuring instruments and the like are now available for supplying information as to the rate of flow in a fluid system. One type of such instrument is disclosed in the aforementioned patents and patent application and comprises a rate flow indicator in which a vane member is movable by fluid flow through the device. The vane member is connected with indicating means to indicate exteriorly of the device the position of the vane member and thus the rate of flow through the device.

As the semi-circular vane member is moved by the fluid flowing through the device it moves along a curved wall section and its pivotal axis is disposed so that such movement produces a separation from the wall section which increases in cross-sectional area from a closed to a maximum open position. In this way the flow meter does not unduly interfere with the rate of flow through the device.

One problem associated with such flow meters is that leakage past the edge of the vane member in the area where it is pivotally mounted will seriously impair the accuracy of the device. Friction produced by attempts to cure this leakage problem interferes with movement of the vane member and therefore also interferes with the accuracy of the device.

The present invention provides a solution to this problem by providng means for sealing the edge of the vane member without producing undue friction.

SUMMARY OF THE INVENTION

The present invention, which will be described subsequently in greater detail, comprises a flow indicator device having an inlet port and an outlet port and a flow responsive vane member carried within the housing between the inlet and outlet ports, the flow responsive vane member being operatively coupled to an externally mounted indicator by means of a shaft which, in turn, is rotatably mounted in a pair of axially aligned bores within the housing. A wall separates the inlet port and the outlet port and the vane member is rotatably mounted adjacent the free edge of the wall. A spring balanced sealing vane is carried at the free edge of the wall to engage the vane member and to prevent fluid leakage between the wall and the vane member.

BRIEF DESCRIPTION OF THE DRAWINGS

The description herein makes reference to the accompanying drawings wherein like reference numerals refer to like parts throughout the several views, and in which:

FIG. 1 is a front elevational view of a flow indicator device constructed in accordance with the principles of the present invention;

FIG. 2 is a cross-sectional view of the flow indicator device of the present invention taken along line 2—2 of FIG. 1;

FIG. 3 is a cross-sectional view through the flow indicator device of the present invention taken along line 3—3 of FIG. 2;

FIG. 4 is a cross-sectional view of the flow indicator device of the present invention taken along line 4—4 of FIG. 2; and FIG. 5 is an enlarged fragmentary cross-sectional view of a portion of the structure illustrated in FIG. 1.

DESCRIPTION OF THE PREFERRED EMBODIMENT

Referring now to the drawing for an understanding of the present invention, a preferred embodiment thereof is illustrated in FIGS. 1-4 in the form of a flow indicator device 10 comprising a housing 11 generally cylindrical in form and having opposing flat-sided portions 12 and 13 and an upper wall 14. An end bell or bowl 16 is fixed in a fluid-tight position across the lower open end of the housing 11 by means of screws 18 and an O-ring seal 20.

The bowl 16 includes a cylindrical stem 22 and an annular flange 24 abutting the housing 11 through which the screws 18 extend, and an annular curved portion 26 joining the stem 22 and flange 24. The stem 22 is bored axially at 28 (FIGS. 2 and 3) so as to provide communication with the interior of the bowl 16 and the housing 11. A plug 29 is insertable in a fluid-tight manner in the bore 28 and carries a pin 30 which extends upwardly into the interior of the bowl 16.

As can best be seen in FIGS. 2 and 3, the interior, substantially semi-spherical, surface 31 of the bowl 16 is curved in a manner and for a purpose which will be described in greater detail hereinafter. A vertical partition 32 projects perpendicularly from the wall 14 toward the bowl 16, between the opposing inner wall surfaces of the housing 11 and extends along a line drawn between the two portions 12 and 13, with the partition 32 dividing the interior of the housing 11 into two spaces 33 and 34, each of an equal volume. The partition 32 is preferably wider at its end face 36 and is flattened along its length. A shaft 38 is rotatably mounted at each end of the housing 11 and extends closely adjacent and parallel to the end face 36. The opposite ends of the shaft 38 are respectively mounted in axially aligned receiving bores 39 and 40 in the housing 11 with the outer diameter of the opposite ends of the shaft 38 and the inner diameters of the respective receiving bores 39 and 40 being closely fitted to permit the shaft 38 to rotate therewithin, while minimizing the rate of fluid leakage through the bores 39 and 40.

A vane member 44 (FIG. 3) of a generally semi-circular configuration is carried at its straight edge by a sleeve member 45 (see FIG. 5) which, in turn, is fixed to the shaft 38 by screws 35 (FIG. 4) so that the vane member 44 and the shaft 38 will rotate together.

The housing 11 is further provided with a substantially cylindrical recess 46 (FIG. 3) registering with the substantially semi-spherical surface 31 of the bowl 16. An annular, radially inwardly extending flange portion 48 (FIG. 3) is disposed in the housing 11 intermediate the chambers 33 and 34 and the recess 46. The recess 46 is formed with a radius equal to the radius of the vane member 44 and on an axis substantially normal to and which bisects the axis of the rotation of the shaft 38 and vane member 44. Thus, when the vane member 44 is disposed in a plane perpendicular to the partition 32, as shown in solid lines in FIG. 3, it extends across the semi-circular space formed by the recess 46 and partition 32 to seal off the space 33 from the interior of the bowl 16 and the space 34. The annular flange portion 48 serves as a stop to prevent the vane member 44 from rotating into the space 33.

The radii of the vane member 44 and the substantial semi-spherical surface 31 formed in the bowl 16 are substantially equal. Thus, if the center of the surface 16 and the center of the semi-sphere circumscribed by the rotating vane member 44 were coincident, then the surface 31 and the semi-sphere circumscribed by the edge of the rotating vane member 44 would continuously separate the spaces 33 and 34 within the housing 11 and the bowl 16 into two substantially fluid-tight compartments between which fluid could not flow. To provide an opening between these two compartments, which will vary in size depending upon the position of the vane member 44, the center of the semi-spherical surface 31 is displaced outwardly from the center of the semi-sphere circumscribed by the rotating vane member 44. Both centers are located along the central axis of the cylindrical housing 11, but the center of the surface 31, which is shown at 50 in FIG. 3, is situated closer to the bowl 16. As a result, the vane member 44 substantially seals the space 33 when it is rotated to the position shown in solid lines in FIG. 3. However, when it is rotated counterclockwise toward the position shown in FIG. 3 in phantom lines, the outer edge of the vane member 44 no longer abuts the inner surface 31 of the bowl 16, and a curved opening through which fluid may pass is thereby created about the semi-circular edge of the vane member 44. The size of the opening increases proportionately as the vane member 44 moves counterclockwise from its closed position through the position shown in phantom lines in FIG. 3. The pin 30 functions to limit the counterclockwise rotational movement of the vane member 44.

The side of the housing 11 adjacent the space 33 is provided with a radially disposed inlet port 52 (FIG. 3) adapted to receive the end of an inlet conduit, not shown, through which the system fluid is directed. The opposite side of the housing 11 adjacent the space 34 is similarly provided with a radially disposed outlet port 54 adapted to be connected to an outlet conduit leading to a fluid user, not shown.

As can best be seen in FIGS. 2 and 4, each end of the shaft 38 extends through its associated axially aligned bore 39 or 40 to the opposite side portions 12 and 13 respectively of the housing 11. The side portion 12 is provided with an annular recess 60 registering with the aligned receiving bore 39 into which the shaft 38 extends. A cap 62 closes the recess 60. A low tension coil spring 64 has one end fixed to the cap 62 by a pin 66 (FIG. 4) and an opposite end fixed to the shaft 38, so that the spring 64 provides a very slight rotational force to the shaft 38, and thus to the vane member 44, to urge the vane member 44 toward the closed position illustrated in FIG. 3. It is to be understood that the spring 64 is not intended to provide any measurable resisting force against fluid moving past the vane member 44, and thus the vane member 44 does not act as a valve in the sense of regulating the amount of flow, but is merely responsive to the force produced by the fluid flowing through the device 10 to assume a position which depends upon the rate of such flow. The free end of the shaft 38 is preferably journaled in the cap 62.

Still referring to FIGS. 3 and 4, the opposite side portion 13 of the housing 11 is provided with an annular recess 67 which registers with the adjacent receiving bore 40. The end of the shaft 38 extends axially through the recess 67 and carries a pointer member 68 (FIG. 1). The pointer member 68 rotates with the shaft 38 and points to suitable indicia 70 disposed on the outer surface of the housing 11.

As described hereinbefore, the vane member 44 and the spring 64 offer only slight resistance to the passing fluid and thus the vane member 44 will be moved to the closed position only when flow through the device 10 is non-existent. When flow is provided through the device 10, it will act upon the vane member 44 to rotate the same in a counterclockwise direction (as viewed in FIG. 3). As the vane member 44 is so rotated, a passage is created between the curved edge of the vane member 44 and the surface 31, which increases in size as the angular rotation of the vane member 44 increases. Thus at each rate of fluid flow through the device 10, the vane member 44 will be moved to a rotational position, opening a passage between the vane member 44 and the surface 31 of a sufficient cross-sectional area to accommodate the particular flow rate through the device. The particular configuration of the vane member 44 and the surface 31 permits a substantially equally divided graduated scale 7o to be provided and marked so that the pointer element 68 will actually indicate the rate of fluid flow through the device at any particular time.

One problem which has been associated with rate meters of this type has been the difficulty created by fluid leakage between the sleeve 45 and the vertical wall 32. A space between these members produces a leakage path which is not affected by the position of the vane member 44 and thus seriously impairs the ability of the device to produce an accurate indication of the rate of flow through the device. Attempts to position the sleeve 45 sufficiently close to the face 36 of the wall 32 to minimize leakage therebetween produces friction which interferes with the free movement of the vane member 44 and which therefore also seriously diminishes the accuracy of the device.

The present invention overcomes this problem by providing a recess 80 (FIG. 5) which extends the length of the face 36 of the wall 32. A sealing vane 82 is carried in the recess 80 and is urged by springs 84 into sealing engagement with the sleeve 45. The springs 84 are carried in spaced pockets 86 as best seen in FIG. 2. The sealing vane 82 thus provides an effective seal between the sleeve 45 and the wall 32 without interfering with movement of the vane member 44.

It is also apparent that although only one embodiment of the present invention has been described, many changes and modifications can be made thereto without departing from the spirit of the invention or the scope of the appended claims.

What is claimed is as follows:

1. A flow indicator device for a fluid system comprising a housing having a chamber, an inlet port and an outlet port registering with said chamber and adapted to be connected with said system; an interior wall extending into said chamber intermediate said inlet port and said outlet port; a vane member rotatably mounted in said housing on an axis disposed closely adjacent the free edge of said interior wall whereby said wall and said vane member cooperate to separate said inlet port from said outlet port; said housing being provided with interior walls having a substantially semi-spherical inner surface, said vane member having a substantially semi-circular edge rotatable adjacent said semi-spherical surface, the center of said semi-spherical surface being displaced from the center of the semi-sphere circumscribed by said circular edge upon rotation of said vane member, whereby the space between said edge and said surface varies at each rotative position of said vane member; a shaft having opposite ends rotatably mounted in said housing; means mounting said vane member to said shaft such that said vane member rotates with said shaft about the axis of rotation of said shaft; the improvement comprising a sealing vane carried by the free edge of said interior wall and extending between said free edge of said interior wall and said vane member to prevent fluid leakage therepast.

2. The flow indicator device defined in claim 1 and including an elongated recess formed in the free edge of said interior wall, said sealing vane being disposed within said recess, and spring means disposed in said recess intermediate said sealing vane and said wall for urging said sealing vane toward said vane member.

3. The flow indicator as defined in claim 1 and in which said means mounting said vane member to said shaft comprises a sleeve mounted to said shaft, said sleeve having a portion receiving an edge of said vane member, said sealing vane engaging said sleeve.

4. The flow indicator device defined in claim 1 wherein said indicating means is mounted exteriorly of said housing and is coupled to one of said shaft ends, said indicating means indicating the position of said vane member and thus indicating the rate of fluid flow through said device.

* * * * *

UNITED STATES PATENT OFFICE
CERTIFICATE OF CORRECTION

Patent No. 3,776,037    Dated December 4, 1973

Inventor(s) Nils O. Rosaen

It is certified that error appears in the above-identified patent and that said Letters Patent are hereby corrected as shown below:

Column 4, line 14, delete the numeral "3" and insert --2--.

Signed and sealed this 23rd day of April 1974.

(SEAL)
Attest:

EDWARD M. FLETCHER, JR.
Attesting Officer

C. MARSHALL DANN
Commissioner of Patents